US006807847B2

(12) United States Patent
Steckler et al.

(10) Patent No.: US 6,807,847 B2
(45) Date of Patent: Oct. 26, 2004

(54) LEAK DETECTION METHOD FOR AN EVAPORATIVE EMISSION SYSTEM INCLUDING A FLEXIBLE FUEL TANK

(75) Inventors: Michael J. Steckler, Loveland, OH (US); Steve L. Melby, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/080,244

(22) Filed: Feb. 21, 2002

(65) Prior Publication Data

US 2003/0154770 A1 Aug. 21, 2003

(51) Int. Cl.[7] ................................................ G01M 3/04
(52) U.S. Cl. .......................................... 73/49.7; 702/51
(58) Field of Search ................................ 73/40, 40.5 R, 73/49.7, 118.1; 702/51; 123/518, 519, 520

(56) References Cited

U.S. PATENT DOCUMENTS

| | | | | | |
|---|---|---|---|---|---|
| 5,261,379 | A | * | 11/1993 | Lipinski et al. | 123/520 |
| 5,317,909 | A | | 6/1994 | Yamada et al. | 73/118.1 |
| 5,614,665 | A | * | 3/1997 | Curran et al. | 73/118.1 |
| 5,750,888 | A | * | 5/1998 | Matsumoto et al. | 73/118.1 |
| 5,878,727 | A | * | 3/1999 | Huls | 123/520 |
| 6,082,189 | A | * | 7/2000 | Bayerle et al. | 73/118.1 |
| 6,164,123 | A | * | 12/2000 | Corkill | 73/49.7 |
| 6,439,213 | B2 | | 8/2002 | Bircann et al. | |
| 6,474,148 | B2 | * | 11/2002 | Takagi et al. | 73/118.1 |
| 6,543,746 | B2 | | 4/2003 | Bircann et al. | |

OTHER PUBLICATIONS

Robichaux et al., US Patent Application US 20020083930A1, Jul. 4, 2002.*

* cited by examiner

*Primary Examiner*—Hezron Williams
*Assistant Examiner*—Charles D. Garber
(74) *Attorney, Agent, or Firm*—Jimmy L. Funke

(57) ABSTRACT

An improved method of testing for evaporative emission system leaks monitors vacuum decay in a closed system so that the effects of fuel tank expansion during the test interval are minimized. In a first embodiment pass/fail criteria are established in terms of the time required for the system pressure to decay by a calibrated amount for a predetermined leak size. A leak at least as large as the predetermined leak is detected if the measured time is shorter than a calibrated time. The effects of fuel tank expansion are minimized because the changes in fuel tank volume occur primarily due to the pressure differential across the tank, as opposed to the leak size, and the changes that occur during the test are essentially the same for any leak size under consideration. In a second embodiment, the pass/fail criteria are established in terms of the change in pressure that occurs in the calibrated time; a leak at least a large as the predetermined leak is detected if the measured change in pressure is larger than the calibrated pressure amount.

2 Claims, 4 Drawing Sheets

LEAK DETECTION METHOD FOR AN EVAPORATIVE EMISSION SYSTEM INCLUDING A FLEXIBLE FUEL TANK

TECHNICAL FIELD

The present invention relates to leak detection in an automotive evaporative emission system, and more particularly to a detection method that accurately detects a leak in a system including a flexible fuel tank.

BACKGROUND OF THE INVENTION

In an automotive evaporative emission system, fuel vapor generated in the vehicle fuel tank is captured in a charcoal-filled canister and subsequently supplied to the engine air intake through a solenoid purge valve. Since the effectiveness of the system can be significantly impaired by faulty operation of a component or by a leak in one or more of the hoses or components, the engine controller is generally programmed to carry out a number of diagnostic algorithms for detecting such failures. If faulty operation is detected, the result is stored and a "check engine" lamp is activated to alert the driver so that corrective action can be taken.

Experience has shown that small leaks in an evaporative system can be particularly difficult to reliably detect. Theoretically, leaks as small as 0.5 mm (0.02 in.) can be detected by closing the vapor purge valve, evacuating the system to a predetermined vacuum level, and then monitoring the vacuum decay rate over a predetermined interval of time. See for example, the U.S. Pat. No. 6,308,119, issued on Oct. 23, 2001, assigned to the assignee of the present invention, and incorporated by reference herein. However, it has been found that the test data can be misinterpreted, particularly in systems where the fuel tank is sufficiently flexible that its contained volume changes during the diagnostic test. Specifically, the volume of the tank tends to increase as the system pressure decays toward atmospheric pressure due to a leak or fuel vapor generation, and this has the effect of reducing the observed decay rate. As a result, a small leak in the evaporative system may go undetected. Accordingly, what is needed is a method of reliably detecting evaporative emission system leaks in a system including a flexible fuel tank.

SUMMARY OF THE INVENTION

The present invention is directed to an improved method of testing for evaporative emission system leaks by monitoring vacuum decay in a closed system, wherein the effects of fuel tank expansion during the test interval are minimized. In a first embodiment, the pass/fail criterion is established in terms of the time required for the system pressure to decay by a calibrated amount corresponding to a predetermined leak size. A leak at least as large as the predetermined leak is detected if the measured time is shorter than a calibrated time. The effects of fuel tank expansion are minimized because the changes in fuel tank volume occur primarily due to the pressure differential across the tank, as opposed to the leak size, and the changes that occur during the test are essentially the same for any leak size under consideration. In a second embodiment, the pass/fail criterion is established in terms of the change in pressure that occurs in the calibrated time; a leak at least as large as the predetermined leak is detected if the measured change in pressure is larger than the calibrated pressure amount.

DESCRIPTION OF THE PREFERRED EMBODIMENT

Figure 1:
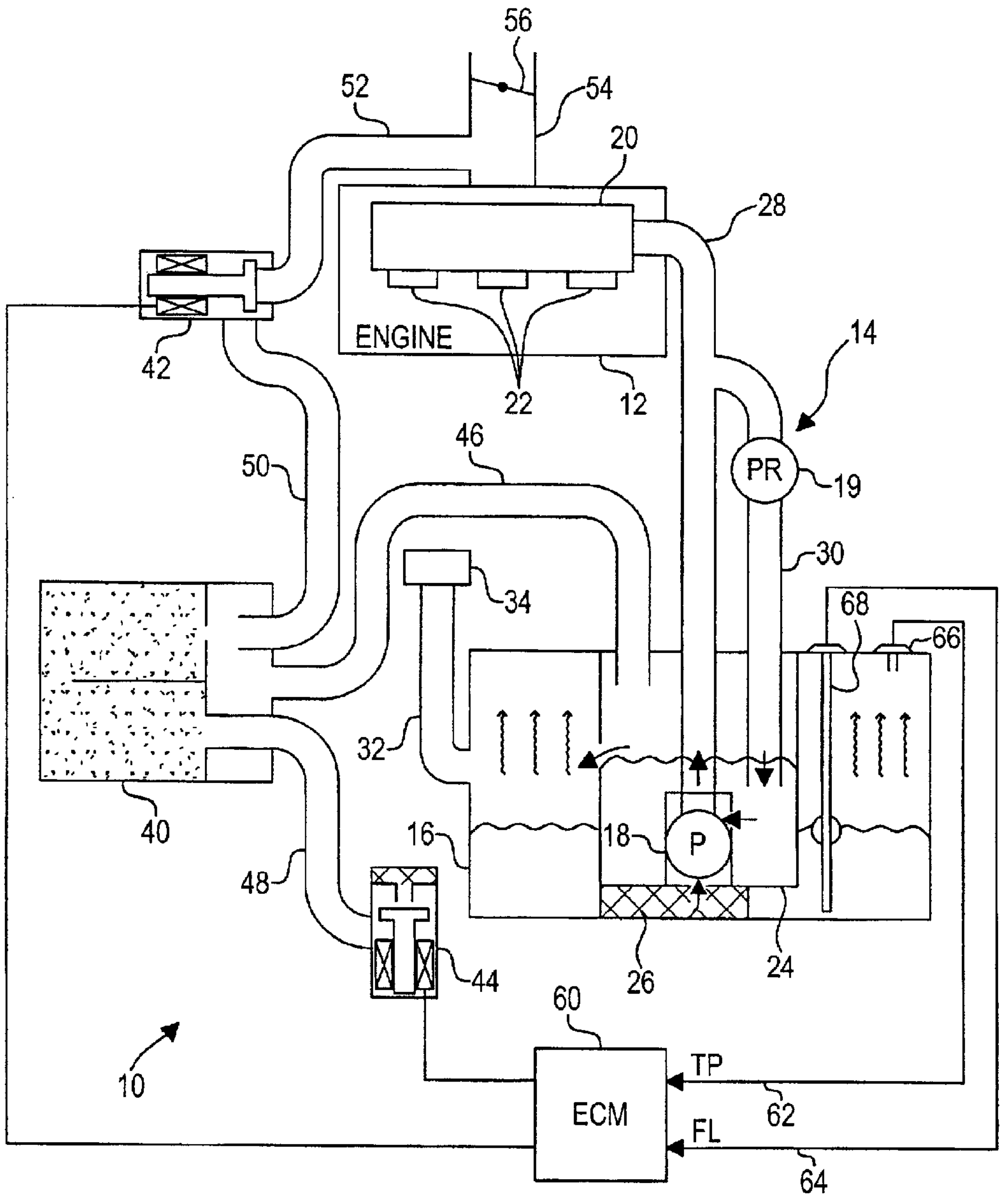
FIG. 1 is a diagram of an automotive evaporative emission system according to this invention, including a microprocessor-based engine control module (ECM).

Referring to FIG. 1, the reference numeral 10 generally designates an evaporative emission system for an automotive engine 12 and fuel system 14. The fuel system 14 includes a fuel tank 16, a fuel pump (P) 18, a pressure regulator (PR) 19, an engine fuel rail 20, and one or more fuel injectors 22. The fuel tank 16 has an internal chamber 24, and the pump 18 draws fuel into the chamber 24 through a filter 26, as generally indicated by the arrows. The fuel line 28 couples the pump 18 to the fuel rail 20, and the pressure regulator 19 returns excess fuel to chamber 24 via fuel line 30. Fuel is supplied to the tank 16 via a conventional filler pipe 32 sealed by the removable fill cap 34.

The evaporative emission system 10 includes a charcoal canister 40, a solenoid purge valve 42 and a solenoid air vent valve 44. The canister 40 is coupled to fuel tank 16 via line 46, to air vent valve 44 via line 48, and to purge valve 42 via line 50. The air vent valve 44 is normally open so that the canister 40 collects hydrocarbon vapor generated by the fuel in tank 16, and in subsequent engine operation, the normally closed purge valve 42 is modulated to draw the vapor out of canister 40 via lines 50 and 52 for ingestion in engine 12. To this end, the line 52 couples the purge valve 42 to the engine intake manifold 54 on the vacuum or downstream side of throttle 56.

The air vent valve 44 and purge valve 42 are both controlled by a microprocessor-based engine control module (ECM) 60, based on a number of input signals, including the fuel tank pressure (TP) on line 62 and the fuel level (FL) on line 64. The fuel tank pressure is detected with a conventional pressure sensor 66, and the fuel level is detected with a conventional fuel level sender 68. Of course, the ECM 60 controls a host of engine related functions, such as fuel injector opening and closing, ignition timing, and so on.

Figure 2:
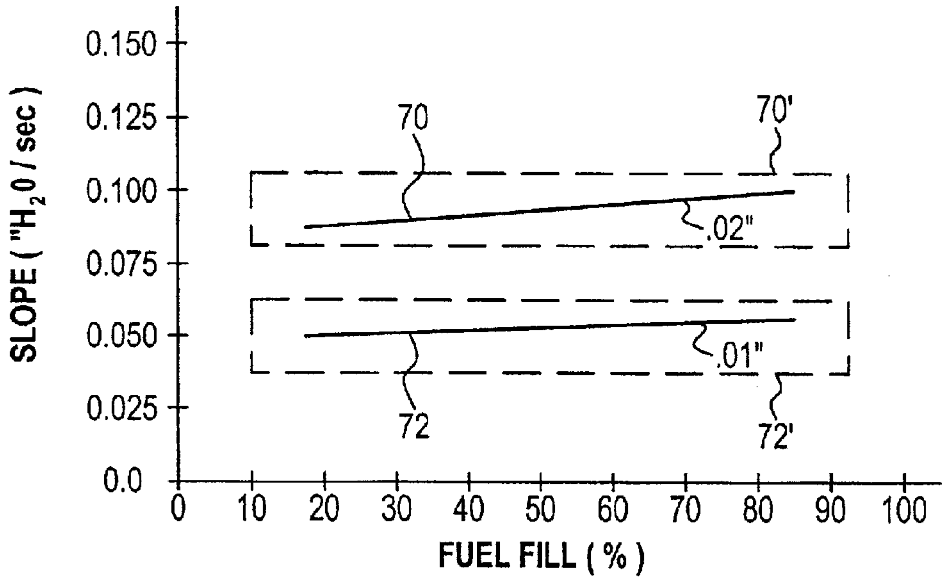
FIG. 2 graphically depicts the vacuum decay rate in the system of FIG. 1 over a calibrated time interval vs. fuel tank level for a 0.01 inch diameter leak and a 0.02 inch diameter leak.

In general, the ECM 60 diagnoses leaks in the evaporative emission system 10 by suitably activating the solenoid valves 42 and 44, and monitoring the fuel tank pressure TP. A conventional leak detection methodology involves setting the valve 44 to its closed state, modulating the valve 42 to establish a predetermined vacuum level in the fuel tank 16, setting the valve 42 to its closed state to establish a closed system, monitoring the TP signal to determine the pressure change over a predetermined interval, and computing the vacuum decay rate or pressure slope over the interval. If the slope exceeds a calibrated slope corresponding to a specified leak size (such as 0.02 inches), the ECM 60 concludes that the system 14 has a leak at least as large as the specified leak. While this approach can be very effective with a rigid fuel tank 16, it has been found that the test results are less reliable if the fuel tank is flexible, such as when the tank is made of plastic, for example. In that case, the tank 16 tends to expand somewhat in the course of the leak testing; this increases the tank volume, which has the effect of reducing the apparent vacuum decay rate, and lessening the difference in the observed decay rates for significant and insignificant leaks. This is illustrated in the graph of FIG. 2, where the traces 70 and 72 designate vacuum decay rates (pressure slopes) over a 30-second interval with a starting vacuum level of 10 inches of water, as a function of the level of fuel (% full) in a flexible tank 16. The trace 70 represents slope data taken with a 0.02 in. leak (which is considered to be significant), while the trace 72 represents slope date taken with a 0.01 in. leak (which is considered to be insignificant). Although the slopes vary only slightly with fuel fill level, they are too closely spaced to reliable distinguish the 0.02 in. leak from the smaller 0.01 in. leak, as indicated by the data envelopes 70' and 72'.

The method of the present invention overcomes the above-described difficulty by carrying out the leak test so that the effects of fuel tank expansion during the test are minimized. In a first embodiment, this is achieved by establishing the pass/fail criteria in terms of the time required for the system pressure to decay by a calibrated amount for a predetermined leak size such as 0.02 in. A leak at least as large as 0.02 in. is detected if the measured time is shorter than a calibrated time. The effects of fuel tank expansion are minimized because the changes in fuel tank volume occur primarily due to the pressure differential across the tank 16, as opposed to the leak size, and the tank volume changes that occur during the test are essentially the same for leaks of 0.02 in. and smaller. In a second embodiment, the pass/fail criteria is established in terms of the change in system pressure that occurs in the calibrated time; a leak at least a large as 0.02 in. is detected if the measured change in pressure is larger than the calibrated pressure amount.

Figure 3:
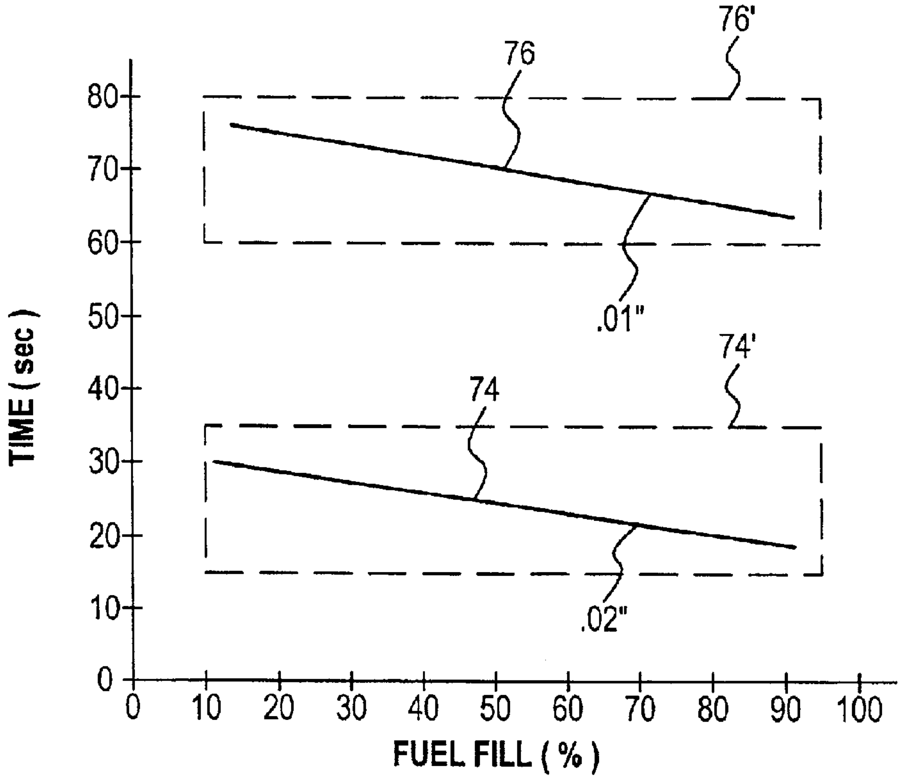
FIG. 3 graphically depicts the time required for the pressure in the system of FIG. 1 to decay by a calibrated amount vs. fuel tank level for a 0.01 inch diameter leak and a 0.02 inch diameter leak.

Traces 74 and 76 of FIG. 3 designate the time required for the system pressure to decay from an initial vacuum level of 10 inches of water to a lower value (8 inches of water), as a function of the level of fuel (% full) in a flexible tank 16. In this case, the lower trace 74 represents the required time with a system leak of 0.02 inches in diameter, while the trace 76 represents the required time with a system leak of 0.01 inches in diameter. As with the example of FIG. 2, the required times vary only slightly with fuel fill level, and in this case, the times are separated sufficiently to reliably distinguish the 0.02 in. leak from the smaller 0.01 in. leak, as indicated by the data envelopes 74' and 76'.

Figure 4:
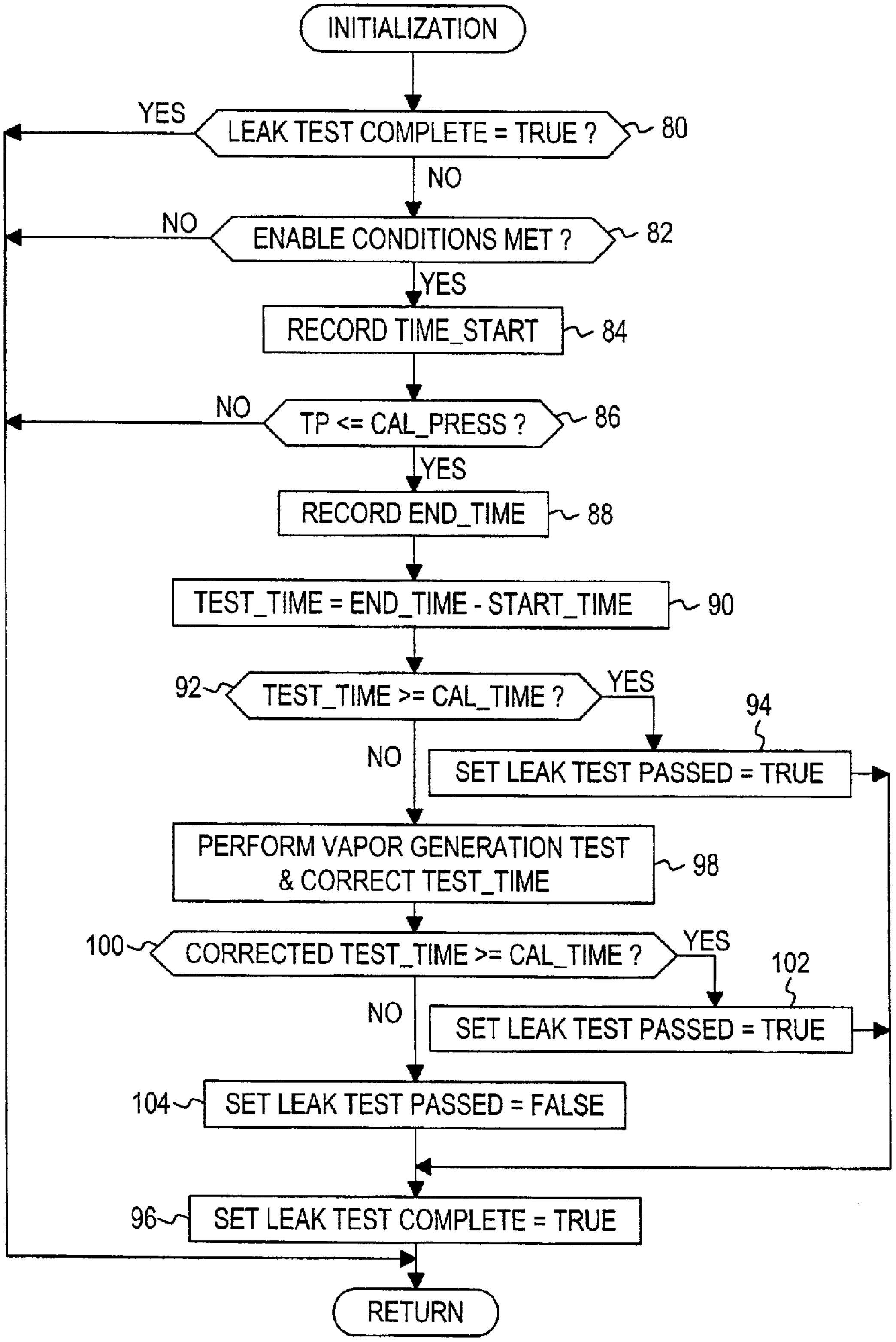
FIG. 4 is a flow diagram representative of a software routine executed by the ECM of FIG. 1 in carrying out the diagnostic method of this invention according to a first embodiment of this invention.

FIG. 4 is a flow diagram representing a software routine periodically executed by the ECM 60 for carrying out the first embodiment of this invention. Following initialization, the block 80 is executed to determine if the LEAK TEST COMPLETE flag is TRUE. Initially, block 80 is answered in the negative, and the block 82 determines if specified leak detection enable conditions have been met. This may involve, for example, determining if the engine coolant temperature is within a predefined range, if the difference between the coolant temperature and the inlet air temperature is within a given range, if the measured fuel level is within a given range, and if the barometric pressure is within a given range. Additionally, it involves determining if the tank pressure TP has been drawn down to a predetermined vacuum level such as 10 in. of water. Once all of the conditions have been met, the block 114 is executed to record the value of a system clock as TIME__START. When the tank pressure TP decays to a calibrated pressure such as 8 in. of water, as determined at block 86, the blocks 88 and 90 are executed to record the value of the system clock as END__TIME and to compute TEST__TIME according to the difference (END__TIME-START__TIME). If TEST__TIME is greater than a calibrated value (CAL__TIME) such as 30 seconds, as determined at block 92, the blocks 94 and 96 are executed to set the LEAK TEST PASSED flag and the LEAK TEST COMPLETE flag to TRUE. Otherwise, the block 98 performs a vapor generation test, and corrects END__TIME for observed pressure changes due to fuel vapor generation, after which the block 100 compares the corrected value of END__TIME to CAL__TIME. If the corrected value of END__TIME is greater than CAL__TIME, the blocks 102 and 96 are executed to set the LEAK TEST PASSED flag and the LEAK TEST COMPLETE flag to TRUE. Otherwise, the blocks 104 and 96 are executed to set the LEAK TEST PASSED flag to FALSE, and the LEAK TEST COMPLETE flag to TRUE, completing the routine.

Figure 5:
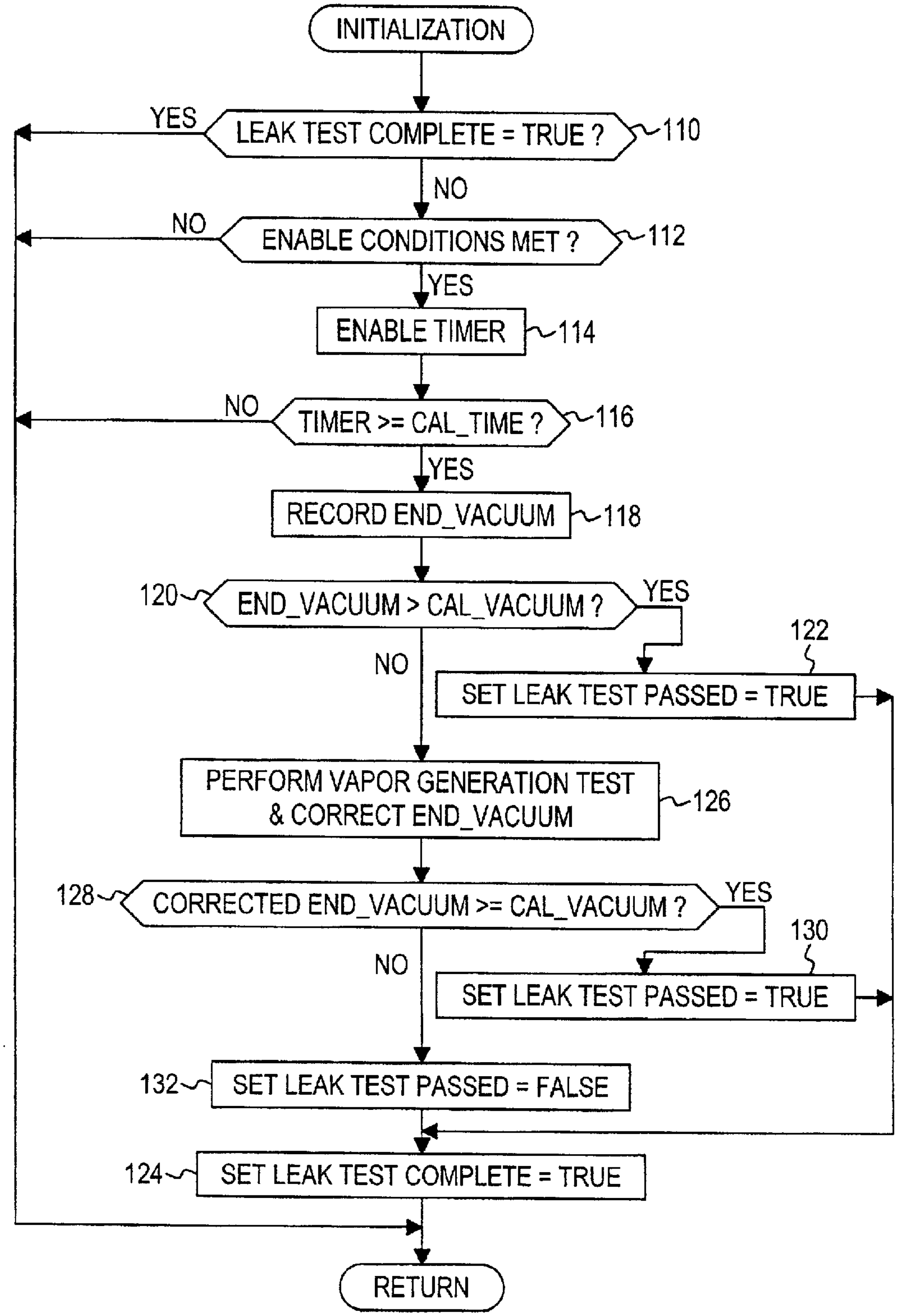
FIG. 5 is a flow diagram representative of a software routine executed by the ECM of FIG. 1 in carrying out the diagnostic method of this invention according to a second embodiment of this invention.

FIG. 5 is a flow diagram representing a software routine periodically executed by the ECM 60 for carrying out the second embodiment of this invention. Following initialization, the block 110 is executed to determine if the LEAK TEST COMPLETE flag is TRUE. Initially, block 110 is answered in the negative, and the block 112 determines if specified leak detection enable conditions have been met. This may involve, for example, determining if the engine coolant temperature is within a predefined range, if the difference between the coolant temperature and the inlet air temperature is within a given range, if the measured fuel level is within a given range, and if the barometric pressure is within a given range. Additionally, it involves determining if the tank pressure TP has been drawn down to a predetermined vacuum level such as 10 in. of water. Once all of the conditions have been met, the block 114 is executed to enable a timer to determine elapsed time. When the timer reaches a calibrated time (CAL__TIME) such as 30 seconds, as determined at block 116, the block 118 records the tank pressure TP as END__VACUUM. If END__VACUUM is greater than a calibrated value (CAL__VACUUM) such as 8 in. of water, as determined at block 120, the blocks 122 and 124 are executed to set the LEAK TEST PASSED flag and the LEAK TEST COMPLETE flag to TRUE. Otherwise, the block 126 performs a vapor generation test, and corrects END__VACUUM for observed pressure changes due to fuel vapor generation, after which the block 128 compares the corrected value of END__VACUUM to CAL__VACUUM. If the corrected value of END__VACUUM is greater than CAL__VACUUM, the blocks 130 and 124 are executed to set the LEAK TEST PASSED flag and the LEAK TEST COMPLETE flag to TRUE. Otherwise, the blocks 132 and 124 are executed to set the LEAK TEST PASSED flag to FALSE, and the LEAK TEST COMPLETE flag to TRUE, completing the routine.

In summary, the diagnostic method of the present invention provides an improved method of testing for evaporative emission system leaks, wherein the effects of fuel tank expansion during the test interval are minimized. While the present invention has been described in reference to the illustrated embodiment, it is expected that various modifications will occur to those skilled in the art. Accordingly, it will be understood that methods incorporating these and other modifications may fall within the scope of this invention, which is defined by the appended claims.

What is claimed is:

1. A method of detecting a leak in an automotive evaporative emission system including the steps of:

reducing a pressure in the system to a predetermined vacuum level;

measuring a time interval required for the pressure in the system to decay from the predetermined vacuum level to a calibrated vacuum level;

correcting the measured time interval to compensate for fuel vapor generation in the system;

comparing the corrected measured time interval to a calibrated time interval corresponding to a specified leak in said system; and detecting the existence of a system leak at least as large as said specified leak when the corrected measured time interval is less than the calibrated time interval.

2. The method of claim 1, including the steps of:

detecting the existence of a system leak at least as large as said specified leak when the measured time interval is less than the calibrated time interval.

* * * * *